United States Patent [19]

Hall

[11] 3,882,350

[45] May 6, 1975

[54] DYNAMIC CONVERGENCE CIRCUIT

[75] Inventor: Cyril John Hall, Zurich, Switzerland

[73] Assignee: RCA Corporation, New York, N.Y.

[22] Filed: Sept. 26, 1973

[21] Appl. No.: 401,089

[30] Foreign Application Priority Data

June 12, 1973 United Kingdom .............. 27791/73

[52] U.S. Cl. ............................................. 315/13 C

[51] Int. Cl. ............................................. H01j 29/50

[58] Field of Search ........ 315/13 C, 27 XY, 27 GD, 315/27 TD, 370, 371

[56] References Cited

UNITED STATES PATENTS

| | | | |
|---|---|---|---|
| 3,622,835 | 11/1971 | Parker | 315/13 C |
| 3,743,882 | 7/1973 | Kroner et al. | 315/13 C |
| 3,763,391 | 10/1973 | Rollins | 315/13 C |

*Primary Examiner*—Maynard R. Wilbur
*Assistant Examiner*—G. E. Montone
*Attorney, Agent, or Firm*—Eugene M. Whitacre; Paul J. Rasmussen

[57] ABSTRACT

A dynamic convergence circuit includes a source of waveforms at a first frequency coupled to a waveshaping network for producing a predetermined current wave through a convergence coil. A modulating stage including an active current conducting device is coupled to the convergence coil in a direct current manner. An input electrode of the active current conducting device is coupled to a source of second frequency waveforms which control the conduction of the device for selectively loading the convergence coil and modulating the first frequency convergence coil current at the second waveform frequency. The active current conducting device may be coupled to the convergence coil by means of a unidirectional current conducting device such that only portions of the convergence coil current of one polarity are modulated.

7 Claims, 4 Drawing Figures

DYNAMIC CONVERGENCE CIRCUIT

BACKGROUND OF THE INVENTION

This invention relates to dynamic convergence circuits useful for converging the beams of a multiple beam color picture tube.

It is recognized that the three beams of a picture tube used in a color television receiver must be substantially converged at all points on the picture tube viewing screen in order to reproduce a scene without undesirable color fringing effects. The geometrical relationship of the beam deflection center to the viewing screen is such that beams which are converged at the center of the screen tend to become overconverged as they are deflected to the edge regions of the viewing screen. This occurs because the distance from the beam deflection center to the relatively flat viewing screen increases as a function of the beam deflection angle with respect to the center of the screen. In delta gun color picture tubes it is common practice to statically converge the beams at the center of the screen by adjusting the position of permanent magnets disposed around the outside of the glass envelope of the picture tube in the neck region of the tube where the beams leave the electron gun assembly. It is common practice to dynamically converge the beams, to achieve substantial convergence of the beams at all other points on the viewing screen, by applying suitably shaped currents to the coils of electromagnets spaced 120° apart around the neck of the picture tube. The electromagnets excite pole pieces located internally of the tube to magnetically influence each of the beams to achieve convergence.

Usually, suitable waveforms at the vertical and horizontal scanning rates are coupled to each of the red and green beam convergence electromagnets. The blue beam convergence electromagnet usually has coupled to it only horizontal scanning rate waveforms as the blue beam is located centrally between the red and green beams and in many situations convergence correction in only a vertical direction is required. As technology progresses and color picture tubes utilizing relatively wide deflection angles, such as 110 degree, are utilized in television receivers, achieving convergence of the beams at all points on the viewing screen becomes more difficult. With regard to convergence techniques for the blue beam, it is often necessary to modulate the horizontal rate convergence waveforms so that their amplitude can be suitably varied as required at different positions on the viewing screen. It is known that modulating the horizontal rate waveforms at the vertical deflection rate can produce the desired net convergence current waveform through the blue convergence coil.

It is desirable to provide the required depth of modulation of the horizontal convergence current by a vertical deflection rate waveform with a relatively simple yet effective circuit. A circuit which is of the "active" type, one requiring several transistors including one or more high cost power transistors, to provide for example 30 percent modulation, is not economically feasible. On the other hand, if modulation is added to a "passive" convergence circuit, one in which the horizontal convergence current is shaped by nonactive elements, it may not be possible to achieve the depth of modulation required or to amplitude modulate the convergence current without undesirably distorting it.

Therefore, it is desirable to provide a relatively simple dynamic convergence circuit with provisions for sufficient modulation without undesirable distortion of the convergence coil current waveform.

SUMMARY OF THE INVENTION

In accordance with the invention, a dynamic convergence circuit is provided.

A first source of waveforms having a first frequency is coupled to waveshaping means for producing a desired convergence current waveform for application to a convergence coil.

A second source of waveforms having a second frequency is coupled to means including an active current conducting device. Means are provided for direct current coupling an output electrode of the active device to the convergence coil for modulating the first frequency convergence current in response to conduction of the active device caused by said second source of waveforms.

A more complete understanding of the invention may be obtained by referring to the following specification and accompanying drawing, of which:

DESCRIPTION OF A PREFERRED EMBODIMENT OF THE INVENTION

Figure 1:
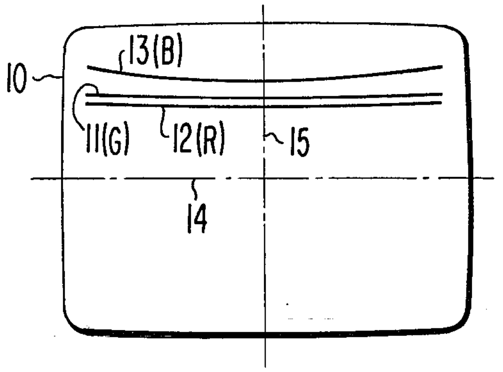
FIG. 1 illustrates a misconvergence condition of three electron beams appearing on the viewing screen of a color picture tube.

FIG. 1 illustrates a misconvergence condition of three electron beams appearing on the viewing screen of a color picture tube. A viewing screen 10 is shown in relation to a horizontal axis 14 and a vertical axis 15. Three raster lines 11, 12 and 13 illustrate three lines formed as the respective green, red and blue lines are deflected across the screen. Ideally, all three of the lines 11, 12 and 13 would be superimposed if the beams were properly converged. Although drawn apart in FIG. 1 for illustrative purposes, it is to be understood that the green and red lines 11 and 12 are in fact superimposed and that the blue line 13 is converged with the other lines at the center of the screen on the vertical axis 15. The problem illustrated in FIG. 1 is that the left and right edges of the blue line 13 are overconverged. Thus, to achieve convergence, it is necessary to provide a circuit which will converge the edges of the blue line 13 so that the three lines will be substantially converged at all points. FIG. 1 illustrates a misconverged beam condition arising in a relatively wide deflection angle picture tube utilzing a delta arrangement of the electron beam guns. It should be noted that the misconverged condition of the blue line 13 is worse at the top of the viewing screen 10 and this misconverged condition decreases towards the horizontal axis 14 at the center of the screen. It is noted that a generally parabolic shaped convergence waveform applied through the blue convergence electromagnetic coil will generally provide convergence for the blue beam. However, in a wide deflection angle picture tube, the situation may occur in which the blue beam will be overconverged by this waveform near the top of the viewing screen. Since, as mentioned above, the misconvergence condition gets worse as distance from the horizontal axis 14 increases, it is necessary to modulate the horizontal parabolic convergence waveform such that it has less amplitude at the top of the viewing screen than at the center.

Figure 2:
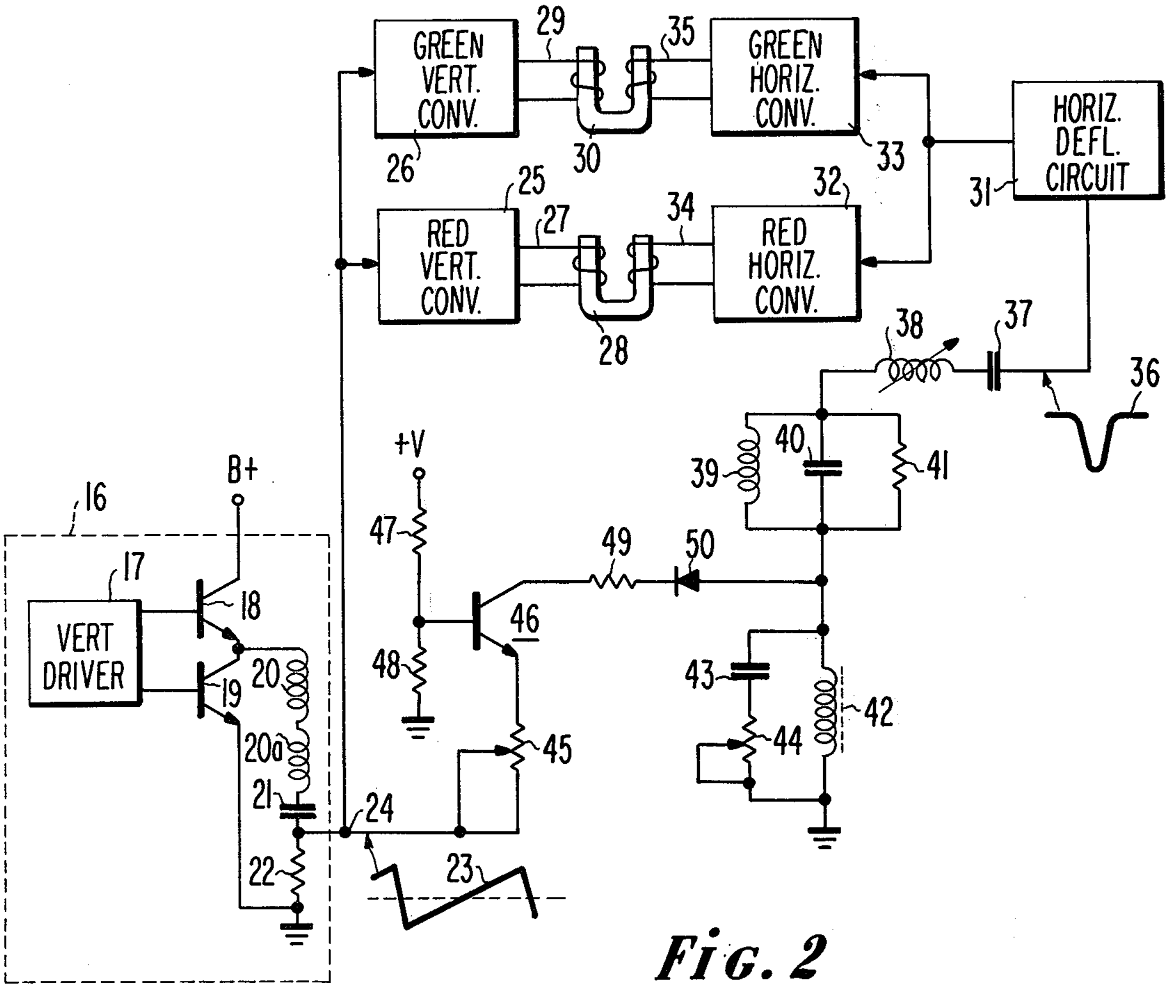
FIG. 2 is a circuit diagram, partly in block and partly in schematic form, of an embodiment of a dynamic convergence circuit in accordance with the invention.

FIG. 2 is a circuit diagram of an embodiment of a dynamic convergence circuit in accordance with the invention which provides correction of the overconvergence condition of the blue beam illustrated in FIG. 1. In general, the convergence circuitry of FIG. 2 receives as inputs vertical deflection rate signals from a vertical deflection stage 16 and horizontal deflection rate signals from a horizontal deflection circuit 31.

In vertical deflection stage 16, suitable vertical driver stage means 17 is coupled to the base electrodes of two serially coupled vertical output stage transistors 18 and 19. The transistors 18 and 19, having their main conduction paths serially coupled between a source of potential B+ and ground, form a conventional push-pull amplifier. The junction of the two transistors, forming an output terminal, is coupled through two serially connected deflection coils 20 and 20*a* through an S-shaping capacitor 21, which also serves a DC blocking function, and through a resistor 22 to ground. Resistor 22 may be of a relatively low ohmic value and serve to provide a feedback signal for the deflection stage. The feedback circuitry is not essential to the operation of this invention and is not shown in the FIGURE. As the vertical deflection stage 16 operates, there is provided at the junction of capacitor 21 and resistor 22 a sawtooth voltage waveform 23 during each vertical deflection interval. The linearly positive going portion of the sawtooth represents the current through the vertical deflection coil necessary to deflect the beam from the top to the bottom of the viewing screen during the scanning portion of each vertical interval. The negative going portion of the waveform 23 represents the retrace portion of each scanning interval during which the electron beams are quickly brought to the top of the viewing screen in preparation for the next scanning interval.

The junction of capacitor 21 and resistor 22, at which point the waveform 23 is developed, is coupled to a red vertical convergence circuit 25 and a green vertical convergence circuit 26. The red and green convergence circuits 25 and 26 suitably shape the sawtooth waveform 23 for providing a desired convergence current in each of the convergence coil windings 27 and 29 of their respective red and green convergence electromagnets 28 and 30. Conventional circuitry may be utilized to achieve these functions.

A terminal of horizontal deflection circuit 31 is coupled to a red horizontal convergence circuit 32 and a green horizontal convergence circuit 33. The red and green horizontal convergence circuits suitably shape the waveforms obtained from deflection circuit 31 for providing a suitable convergence current waveform through coil windings 34 and 35 of the respective red beam convergence electromagnet 28 and green electron beam convergence electromagnet 30. Circuitry described thus far may be of a conventional nature and supplies the suitable convergence currents necessary to converge the red and green electron beams both horizontally and vertically.

Terminal 24 is coupled through a variable resistor 45 to the emitter electrode of a transistor 46. Resistors 47 and 48 are serially coupled between a source of potential +V and ground. The junction of resistors 47 and 48 provides a bias voltage which is coupled to the base of transistor 46. The collector electrode of transistor 46 is coupled through a resistor 49 and a diode 50 poled as indicated to a convergence coil winding 42.

A pulse 36 obtained from horizontal deflection circuit 31 is coupled through a capacitor 37 and a variable inductance 38 to one terminal of a network comprising the parallel combination of an inductance 39, capacitor 40 and a resistor 41. The other terminal of this parallel network is coupled to convergence coil winding 42. The series arrangement of a capacitor 43 and a damping potentiometer 44 is coupled across convergence coil 42 and forms a resonant circuit therewith.

Figure 3A:
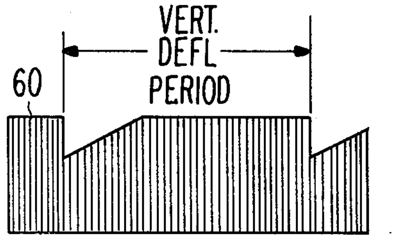
FIGS. 3*a* and 3*b* illustrate convergence coil waveforms obtained in the circuit of FIG. 2.
Figure 3B:
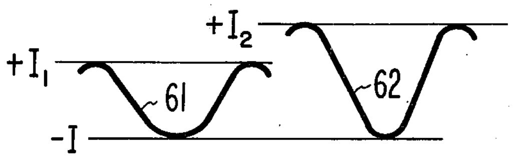

In operation, the negative polarity horizontal rate pulses 36 are coupled through capacitor 37 and amplitude adjusting inductance 38 and are integrated in the parallel network comprising inductance 39, capacitor 40 and resistor 41, and are then coupled to the convergence coil 42 wherein the waveforms are further integrated to form a parabolic waveform such as illustrated by the waveforms 61 and 62 in FIG. 3*b*. This portion of the circuit serves by double integration of a horizontal rate pulse to provide a parabolic convergence correction current in the convergence coil 42. As explained above, it may be necessary to amplitude modulate this parabolic convergence current to eliminate an overconvergence condition of the blue electron beam such as illustrated in FIG. 1.

The sawtooth wave 23 obtained at terminal 24 is applied to the emitter of transistor 46. Transistor 46 is connected in circuit as a common-base amplifier. The conduction of transistor 46 is dependent upon the polarity and amplitude of the sawtooth wave 23 relative to the bias potential at the base of the transistor. The transistor is forward biased during the negative portion of the sawtooth wave 23. With transistor 46 thus biased for conduction, current will be conducted from convergence coil 42 through diode 50 and resistor 49 when diode 50 is forward biased by the positive peaks of the parabolic current waveforms, such as shown in FIG. 3*b*.

As transistor 46 conducts, it provides a variable shunt loading of the horizontal rate parabolic convergence current. Variable resistor 45 sets the modulation depth by controlling the amount of conduction of transistor 46. The value of resistor 47 can be selected to determine the time within the period of vertical deflection waveform 23 that transistor 46 conducts and provides loading of the convergence coil 42. For example, if the overconverged condition of the beams illustrated in FIG. 1 was only in the top third of the viewing screen, the resistor 47 would be selected to enable conduction of transistor 46 only during the first third of the sawtooth waveform 23. The depth of modulation during this interval can be adjusted, for example, from about 5 percent to about 40 percent by adjusting the value of resistor 45. Resistor 49 limits the maximum current that transistor 46 can conduct, thereby placing a limit on the maximum modulation depth and protecting the transistor from damage due to excessive current.

FIG. 3*a* illustrates the modulation envelope of the horizontal parabolic waveform 60 extending over the vertical deflection period. It can be seen from FIG. 3*a* that the horizontal energy is reduced during the first third of the vertical interval and that the modulation is in the shape of a sawtooth corresponding to the modulating sawtooth waveform 23 of FIG. 2.

A main feature of the convergence circuitry in accordance with the invention is the direct current coupling of the shunt load including transistor 46 to the convergence coil 42. Resistor 49 and diode 50 provide this coupling. Diode 50 produces a direct current component when it conducts during the positive portions of the horizontal rate convergence current, which direct current component alters the average level of the parabolic current waveform through convergence coil 42. Thus, as illustrated in FIG. 3*b*, waveform 62, which waveform represents an unloaded parabolic convergence current through the convergence coil, has an amplitude extending from $-I$ to $+I_2$. When diode 50 conducts, and the shunt path through resistor 49, transistor 46, variable resistor 45 and resistor 22 to ground is completed, only the positive portions of the current waveform are loaded, as illustrated by waveform 61 in FIG. 3*b*. Because the average value of the waveform is reduced in proportion to the amount of energy conducted by diode 50, this change in DC average value serves to keep the negative peak portion of the loaded parabola 61 at substantially the same level as the negative peak portion of the unloaded current waveform 62. This has the advantage of not shifting the beam at the center region of the viewing screen located around the vertical axis 15 of FIG. 1. Thus, with the convergence coil current being attenuated only at the edges of the raster corresponding to the positive peaks of the horizontal rate parabolic current, the overconvergence of the beam at the edges is corrected and the beam at the center portion of the raster is substantially unaffected.

As previously mentioned, the resonant network comprising convergence coil 42, capacitor 43 and damping resistor 44 resonates at the horizontal scanning rate. Thus, even when diode 50 and transistor 46 are conducting, the direct current loading does not distort the parabolic shape of the waveform at the relatively high Q of the resonant circuit maintains the desired parabolic shape.

Since diode 50 passes current in one direction only, the shunt load active device, transistor 46, can only be a unidirectional conducting device such as a transistor operating in its normal mode. Because the transistor operates in its normal mode, its conduction can easily be controlled over the full range from cut-off to saturation thereby providing a large modulating waveform, i.e., sawtooth waveform 23, within this range. Further, transistor 46 can be a relatively low power small signal transistor, thereby reducing the cost of the circuit.

It should be noted that should a positive going sawtooth waveform 23 not be available, a negative going sawtooth waveform could be substituted by applying this modulating sawtooth waveform to the base of the transistor and returning the potentiometer 44 to ground instead of terminal 24. Further, it should be understood that the modulating waveform illustrated, waveform 23, need not be limited to a sawtooth, but could be any desired and suitably shaped waveform having the vertical deflection frequency.

What is claimed is:

1. A dynamic convergence circuit comprising:

a first source of waveforms having a first frequency;

a convergence coil;

waveshaping means coupled to said first source and to said convergence coil for producing a desired convergence current waveform at said first frequency in said convergence coil;

a second source of waveforms having a second frequency;

means including an active current conducting device having an input electrode coupled to said second source; and unidirectional conducting direct current coupling means for direct current coupling an output electrode of said device to said convergence coil through a single conduction path for amplitude modulating said first frequency convergence current in response to simultaneous conduction of said device and said unidirectional conducting means caused by said second source of waveforms.

2. A dynamic convergence circuit according to claim 1 wherein said unidirectional conducting direct current coupling means for direct current coupling includes a diode poled for conducting convergence current of a first polarity when said active current conducting device is conducting in response to said second waveforms.

3. A dynamic convergence circuit according to claim 2 wherein said means including an active current conducting means includes biasing means for permitting conducting of said active current conducting means during only a portion of said second frequency waveforms.

4. A dynamic convergence circuit according to claim 3 wherein said waveshaping means produces a substantially parabolic convergence current in said convergence coil at said first frequency.

5. A dynamic convergence circuit according to claim 4 wherein said second source of waveforms produces substantially sawtooth shaped waveforms at said second frequency.

6. A dynamic convergence circuit according to claim 5 wherein said first frequency waveforms are at the horizontal deflection rate and said second frequency substantially sawtooth waveforms are at the vertical deflection rate whereby the horizontal rate parabolic convergence current is amplitude modulated by the vertical deflection sawtooth waveforms when said active conducting device conducts.

7. A dynamic convergence circuit according to claim 6 wherein said active conducting device comprises a transistor and said unidirectional device comprises a diode, said transistor having its main conduction path coupled to one terminal of said diode remote from said convergence coil and to a point of reference potential for providing a shunt path for said convergence coil current.

* * * * *

UNITED STATES PATENT OFFICE
CERTIFICATE OF CORRECTION

PATENT NO. : 3,882,350

DATED : May 6, 1975

INVENTOR(S) : Cyril John Hall

It is certified that error appears in the above-identified patent and that said Letters Patent are hereby corrected as shown below:

Column 5, line 43, that portion reading "only" should read -- also --. Column 6, line 33 that portion reading "conducting" (first occurrence) should read -- conduction --.

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*